(12) United States Patent
Warashina et al.

(10) Patent No.: US 6,754,962 B2
(45) Date of Patent: Jun. 29, 2004

(54) BUSH CUTTING APPARATUS

(75) Inventors: Makoto Warashina, Wako (JP); Takao Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/047,972

(22) Filed: Jan. 15, 2002

(65) Prior Publication Data

US 2002/0095797 A1 Jul. 25, 2002

(30) Foreign Application Priority Data

Jan. 23, 2001 (JP) ........................................ 2001-014069

(51) Int. Cl.[7] ................................................ B26B 7/00
(52) U.S. Cl. ........................ 30/276; 56/11.3; 192/18 R
(58) Field of Search ........................ 56/225, 295, 11.3, 56/11.8, 17.4, 17.5; 192/13 R, 18 B, 15 BA, 104, 8 R, 104 C, 103 CD, 201, 12 R, 15, 18 R, 93 A, 18, 110 B; 30/276, 381, 357, 165

(56) References Cited

U.S. PATENT DOCUMENTS

| | | | |
|---|---|---|---|
| 3,871,159 A | * | 3/1975 | Shriver ........................ 102/260 |
| 4,048,787 A | * | 9/1977 | Harkness et al. ............. 56/11.3 |
| 4,205,737 A | * | 6/1980 | Harkness et al. ......... 192/17 R |
| 4,286,701 A | * | 9/1981 | MacDonald ............... 192/18 R |
| 4,369,616 A | * | 1/1983 | Cody et al. ................... 56/11.3 |
| 4,428,184 A | * | 1/1984 | Hoff ............................. 56/295 |
| 4,667,786 A | * | 5/1987 | Sato et al. ................. 192/17 R |
| 4,738,089 A | * | 4/1988 | Smucker et al. .............. 56/255 |
| 4,841,929 A | * | 6/1989 | Tuggle et al. ............ 123/198 E |
| 5,570,765 A | * | 11/1996 | Patridge ........................ 192/15 |
| 5,855,069 A | * | 1/1999 | Matsubayashi et al. ........ 30/276 |
| 6,021,630 A | * | 2/2000 | Higashi et al. ............... 56/11.3 |

FOREIGN PATENT DOCUMENTS

| | | | |
|---|---|---|---|
| GB | 0 620 964 A1 | * 10/1994 | .......... A01D/34/68 |
| JP | 51053248 | 4/1976 | |
| JP | 51099039 | 8/1976 | |

* cited by examiner

Primary Examiner—Allan N. Shoap
Assistant Examiner—Ghassem Alie
(74) Attorney, Agent, or Firm—Adams & Wilks

(57) ABSTRACT

A bush cutting apparatus has a first rotational shaft mounted for undergoing rotation and a cutter blade connected to the first rotational shaft for rotation therewith. A clutch mechanism has a rotational member, at least one clutch moving member mounted on the rotational member for undergoing movement along a radial direction of the rotational member, a clutch drum mounted on the first rotational shaft for sliding movement therealong to engage the clutch moving member, and a clutch resilient member for biasing the clutch moving member toward an axial centerline of the rotational member. A brake mechanism has a brake shoe formed at an end portion of the clutch drum, a brake pad disposed opposite to and confronting the brake shoe, and a braking resilient member for biasing the brake shoe into pressure contact with the brake pad. A drive source has a second rotational shaft for selectively rotating the rotational member of the clutch mechanism at rotational speeds higher or lower than a preselected rotational speed. The second rotational shaft is axially spaced from and operatively connected to the first rotational shaft via the clutch mechanism and the brake mechanism for rotationally driving the first rotational shaft.

19 Claims, 6 Drawing Sheets

BUSH CUTTING APPARATUS

FIELD OF THE INVENTION

This invention relates generally to a bush cutting apparatus, and more particularly to an improved brake mechanism for stopping rotation of a cutter blade of a bush cutting apparatus.

BACKGROUND OF THE INVENTION

Brake mechanisms of bush cutting apparatuses are known, for example, from Japanese Utility Model Laid-Open Publication Nos. 51-53248 and 51-99039. The first-mentioned 51-53248 publication discloses a bush cutting apparatus which includes brake shoes and cam plates for moving the brake shoes into and out of engagement with a driven shaft. As a human operator releases a brake bar, the cam plates are caused, via springs, to pivot to press the brake shoes against the driven shaft, so that there is automatically produced a braking force to stop rotation of the rotary cutter.

The second-mentioned 51-99039 publication discloses a bush cutting apparatus which includes a brake lining provided along the outer periphery of a clutch drum. As a human operator releases a lever, the brake lining comes into engagement with the outer periphery of the clutch drum and a signal is generated from a movable contact to deactivate a prime mover or drive source, so that a rotary cutter can be caused to stop its rotation.

With the structure disclosed in the 51-53248 publication, it would take a considerable deal of time and labor to deactivate the rotary cutter because the human operator is required to manually manipulate the brake lever. Further, the disclosed structure requires a great number of component parts, such as the brake lever, wires and the like and hence add to production costs.

Also, with the structure disclosed in the 51-99039 publication, it would take a considerable deal of time and labor to deactivate the drive source and rotary cutter because the human operator is required to manually manipulate the lever, which leads to a poor operability. Further, in the disclosed bush cutting apparatus, a control rod coupled to one end of a connecting wire extends through a hole formed in a clutch housing, and measures for maximizing dust-tightness and water-tightness must be taken in relation to the hole in the clutch housing. Furthermore, extra operations are necessary for checking and adjusting the tension of the connecting wire coupled at the other end to the lever, which would require an extra time and labor.

SUMMARY OF THE INVENTION

In view of the foregoing, it is an object of the present invention to provide an improved bush cutting apparatus which can achieve an enhanced operability and enhanced dust-tightness and water-tightness and which can be manufactured at reduced costs.

According to one embodiment of the present invention, there is provided an improved bush cutting apparatus of the type which includes a cutter-blade driving shaft having a cutter blade attached thereto and a drive source having an output shaft operatively connected with the cutter-blade driving shaft for rotating the cutter-blade driving shaft via a clutch mechanism and a brake mechanism. The clutch mechanism in the bush cutting apparatus of the invention comprises: a rotating member mounted on the output shaft of the drive source; a clutch moving member mounted on the rotating member for sliding movement along a radial direction of the rotating member, the clutch moving member having a tapered outer side surface; a clutch drum mounted on the cutter-blade driving shaft for axial movement therealong and having a tapered portion with an inner surface corresponding in contour to the tapered outer side surface of the clutch moving member; and a clutch resilient member for normally pulling the clutch moving member toward an axial centerline of the rotating member. The brake mechanism comprises: a brake shoe formed at a tip of an open end portion of the clutch drum that constitutes a greatest diameter region of the tapered portion in the clutch drum; a brake pad secured to a non-rotating fixed housing in opposed relation to the brake shoe; and a braking resilient member for normally pressing the brake shoe against the brake pad. When the rotating member is not rotated by the drive source at more than a predetermined rotation speed, the clutch moving member is kept disengaged from the clutch drum due to pulling force of the clutch resilient member so that the brake shoe is pressed against the brake pad to apply the brakes. But, when the rotating member is rotated by the drive source at more than a predetermined rotation speed, the clutch moving member is moved radially outward to press the clutch drum by centrifugal force in such a manner that the clutch drum is caused, by the tapered outer side surface of the clutch moving member, to slide to a non-braking position.

When the rotation of the rotating member and hence of the cutter blade has fallen below the predetermined rotation speed, the brake mechanism is automatically activated to terminate the rotation of the cutter blade. Namely, when the number of rotations of the drive source and hence of the clutch mechanism has fallen below a predetermined value, the moving member in the clutch mechanism is disengaged from the clutch drum, and thus the clutch drum is freed and resiliently slid, by the brake mechanism, back to a predetermined braking position where the brake shoe is pressed against the brake pad to apply the brakes; namely, in this case, the brake mechanism causes the brake shoe to be pressed against the brake pad via the braking resilient member. As a result, the clutch drum having the brake shoe as well as the cutter-blade driving shaft and the cutter blade is caused to stop rotating. Because the brake mechanism is thus automatically activated in accordance with a variation in the number of rotations of the drive source, the present invention can eliminate the need for a human operator to manually manipulate a brake lever or the like, and thus allows the human operator to manipulate the bush cutting apparatus with a significantly enhanced operability.

On the other hand, when the number of rotations of the drive source and hence of the clutch mechanism has increased above a predetermined value, the clutch moving member in the clutch mechanism is caused to slide radially outward along the rotating member in such a manner that the clutch moving member slides the clutch drum to the non-braking position against the bias of the braking resilient member while transmitting the rotational force from the rotating member to the clutch drum by means of the tapered outer side surface, so that the brake shoe formed on the clutch drum is disengaged from the brake pad to release the brakes.

With such arrangements, the present invention can dispense with a lever and wire for braking operation by the human operator and eliminate a need for an apparatus housing to have a hole for passing component parts, such as a wire and rod, through the housing. As a result, the present invention can achieve enhanced dust-tightness and water-tightness of the bush cutting apparatus. Further, because the parts, such as the brake lever and wire, can be dispensed with, the bush cutting apparatus of the present invention can be manufactured at reduced costs.

According to another embodiment of the present invention, there is provided another improved bush cutting apparatus of the type including a cutter-blade driving shaft having a cutter blade attached thereto and a drive source having an output shaft operatively connected with the cutter-blade driving shaft for rotating the cutter-blade driving shaft via a clutch mechanism and brake mechanism. In this bush cutting apparatus, the clutch mechanism comprises: a rotating member mounted on the output shaft of the drive source; a clutch moving member mounted on the rotating member for movement along radial and axial directions of the rotating member; a clutch drum mounted on the cutter-blade driving shaft for axial movement therealong; and a clutch resilient member for normally pulling the clutch moving member toward an axial centerline of the rotating member. The brake mechanism comprises: a brake shoe formed at a tip of an open end portion of the clutch drum; a brake pad secured to a non-rotating fixed housing in opposed relation to the brake shoe; and a braking resilient member for normally pressing the brake shoe against the brake pad. When the rotating member is not rotated by the drive source at more than a predetermined rotation speed, the clutch moving member is kept disengaged from the clutch drum due to pulling force of the clutch resilient member in such a manner that the brake shoe is pressed against the brake pad to apply the brakes, while when the rotating member is rotated by the drive source at more than a predetermined rotation speed, the clutch moving member is moved radially outward and axially to press and slide the clutch drum in a direction where the brake shoe is disengaged from the brake pad.

When the number of rotations of the drive source and hence of the clutch mechanism has fallen below a predetermined value in the other embodiment, the moving member in the clutch mechanism is disengaged from the clutch drum, and thus the clutch drum is freed and resiliently slid, by the brake mechanism, back to a predetermined braking position where the brake shoe is pressed against the brake pad to apply the brakes; namely, the brake mechanism causes the brake shoe to be pressed against the brake pad via the braking resilient member. As a result, the clutch drum having the brake shoe as well as the cutter-blade driving shaft and the cutter blade is caused to stop rotating. Because the brake mechanism is thus automatically activated in accordance with a variation in the number of rotations of the drive source, the present invention can eliminate the need for a human operator to manually manipulate a brake lever or the like, and thus allows the human operator to manipulate the bush cutting apparatus with a significantly enhanced operability.

On the other hand, when the number of rotations of the drive source and hence of the clutch mechanism has increased above a predetermined value, the clutch moving member in the clutch mechanism is caused not only to slide radially outward along the rotating member but also move in the axial direction away from the brake pad. Such movement of the clutch moving member causes the brake shoe of the clutch drum to disengage from the brake drum, thereby releasing the brakes.

With such arrangements, the present invention can dispense with a lever and wire for braking operation by the human operator and eliminate a need for an apparatus housing to have a hole for passing component parts, such as a wire and rod, through the housing. As a result, the present invention can achieve enhanced dust-tightness and water-tightness of the bush cutting apparatus.

In a preferred embodiment of the present invention, a plurality of the clutch moving members are provided symmetrically with each other about the axial centerline of the rotating member. The symmetrical arrangement can distribute the weights of the moving members and thus can reliably prevent unbalance during the rotation. Further, the symmetrical arrangement permits synchronization between the two moving members and thereby allows the clutch mechanism and brake mechanism to operate smoothly, so that reliable brake performance can be accomplished.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
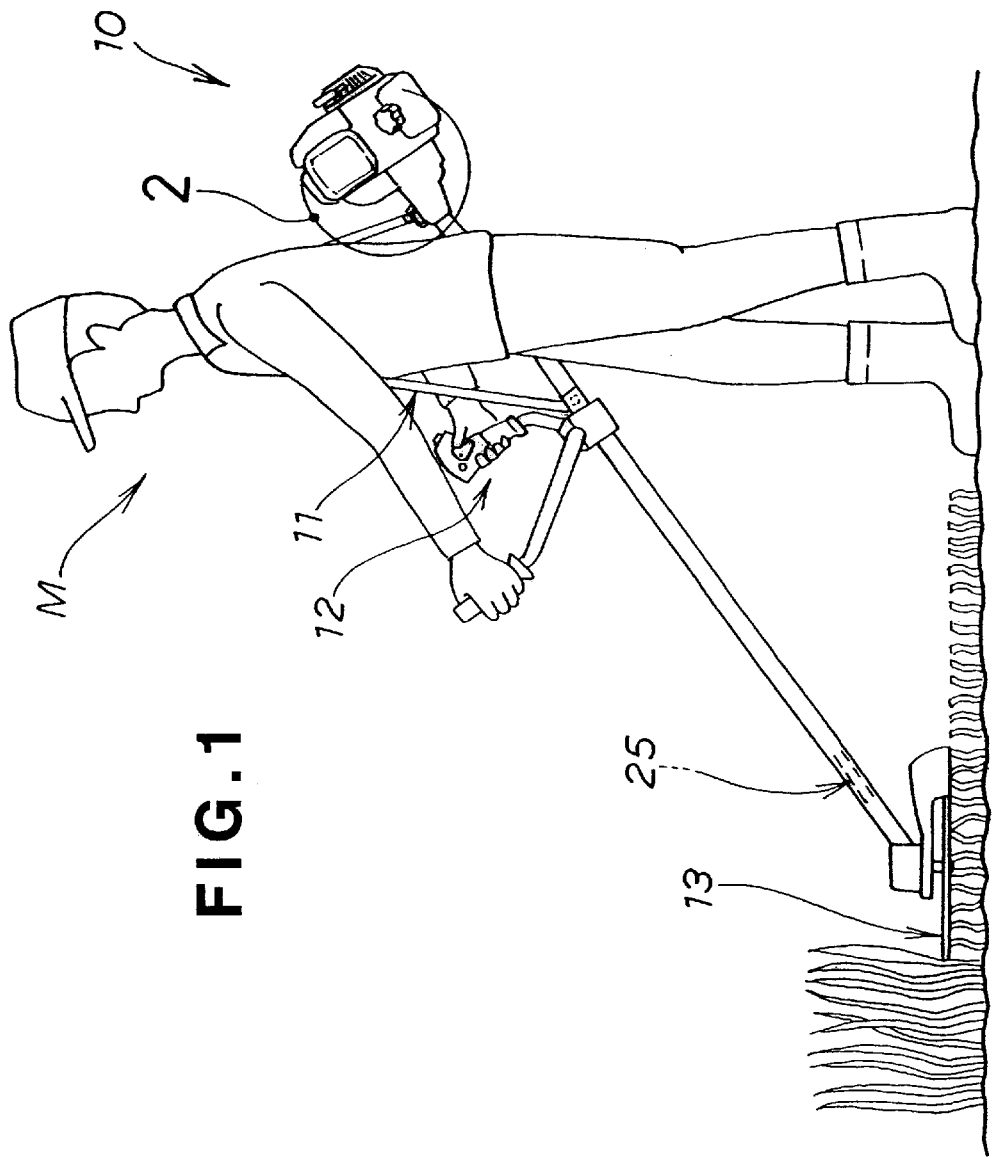
FIG. 1 is a view showing a manner in which a human operator cuts bushes using a bush cutting apparatus in accordance with a first embodiment of the present invention.

FIG. 1 is a view showing a manner in which a human operator cuts bushes using a bush cutting apparatus in accordance with a first embodiment of the present invention. Namely, the human operator is shown here as carrying the bush cutting apparatus 10 with a belt 11 suspended from one of operator's shoulders and gripping a handling portion 12 of the cutting apparatus 10 with one of his or her hands. The bush cutting apparatus 10 includes a rotary cutting blade 13 and various other components as will be described in detail hereinbelow.

Figure 2:
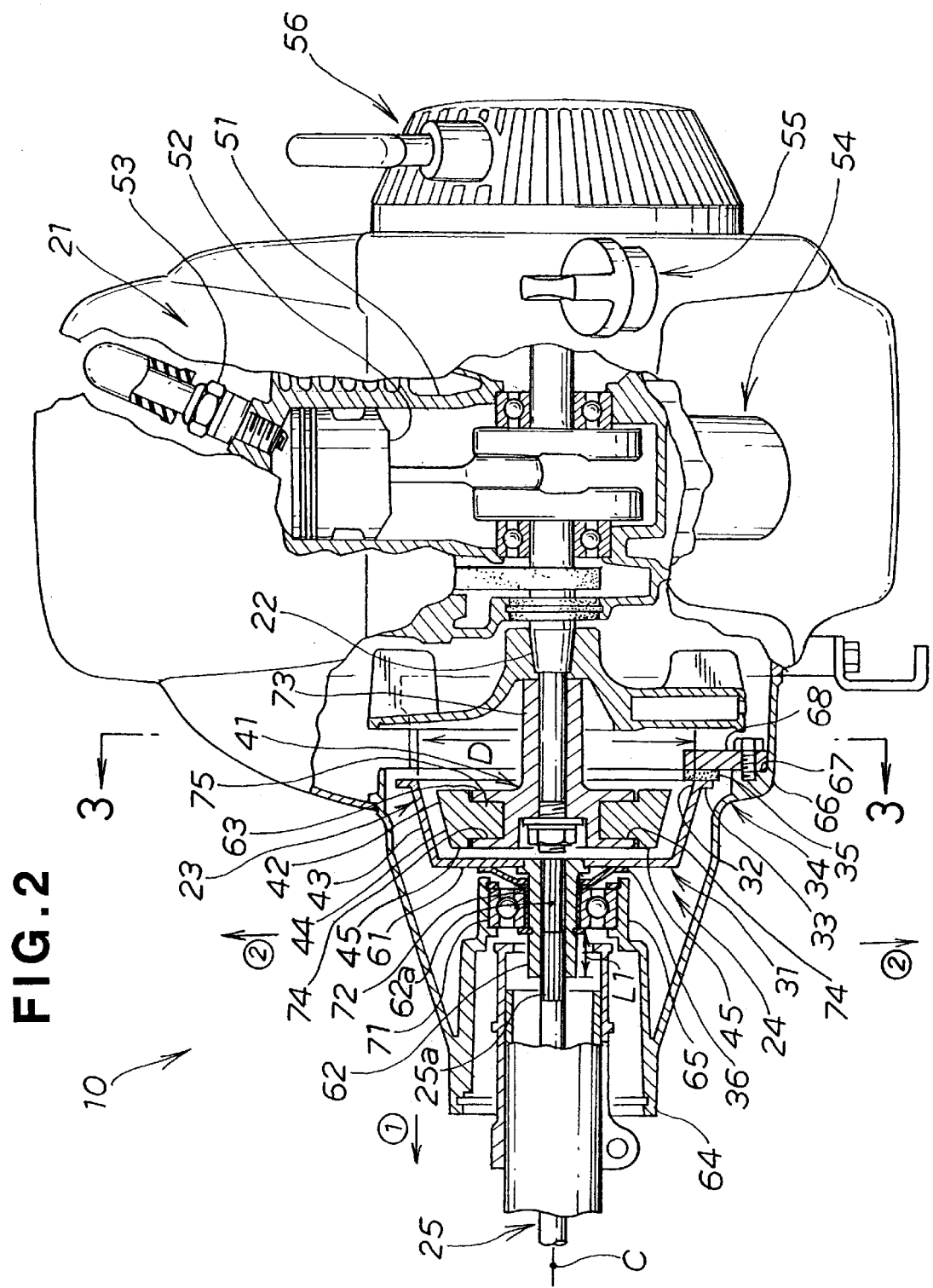
FIG. 2 is a partly-sectional front view of a body section of the cutting apparatus shown in FIG. 1.

FIG. 2 is a partly-sectional front view of a body section of the cutting apparatus 10 circled at 2 in FIG. 1. As shown, the bush cutting apparatus 10 includes a prime mover or drive source 21, a clutch mechanism 23 and brake mechanism 24 connected to a crankshaft 22 of the drive source 21, and a cutter-blade driving shaft 25 connected to the clutch mechanism 23.

The clutch mechanism 23 includes a rotating member 41 mounted on the crankshaft 22 functioning as an output shaft of the drive source 21. The clutch mechanism 23 also includes two moving members 45 each having, on its outer side (i.e., the side remote from the crankshaft 22), a tapered surface 44 tapering in a direction away from the drive source 21, and the moving members 45 are mounted on the rotating member 41 for sliding movement along radial directions of the rotating member 41 as denoted by arrow ②. The clutch mechanism 23 further includes a clutch drum 31 that is mounted on the cutter-blade driving shaft 25 for movement along the axial direction (denoted by arrow ①) of the shaft 25 and that has a tapered portion 43 with an inner surface corresponding in contour to the tapered outer side surfaces 44 of the moving members 45. The clutch mechanism 23 further includes resilient members 46 (FIG. 3) that normally pulls the moving members 45 toward each other, i.e. toward the centerline C of the rotating member 41.

Brake mechanism 24 includes a brake shoe 33 formed at the tip of an open end portion 32, closer to the drive source 21, of the clutch drum 31 which constitutes a greatest-diameter portion of the tapered portion 43, brake pads 35 secured to a non-rotating fixed housing 34 in axially-opposed relation to the brake shoe 33, and a braking resilient member 36 for normally pressing the brake shoe 33 against the brake pads 35.

The prime mover or drive source 21 includes a cylinder 51, a piston 52, the above-mentioned crankshaft 22, and a sparking plug 63. Reference numeral 54 in FIG. 2 represents a fuel tank, 55 an oil tank, and 56 a starting device.

The tapered clutch drum 31 has the brake shoe 33 of the brake mechanism 24 formed, as a kind of radial flange, at the tip of the open end portion (right end portion in FIG. 2) 32 having the greatest diameter D, and a disk-shaped connecting portion 61 at its bottom end portion (left end portion in FIG. 2) having a smallest diameter. Connecting shaft 62 is coupled to the connecting portion 61 and has serrations 62a in its axial middle portion for coupling with the cutter-blade driving shaft 25. For this purpose, the cutter-blade driving shaft 25 has, in its end portion closer to the clutch drum 31, serrations 25a meshing with the serrations 62a by a given axial length L1.

The housing 34 has a bearing portion 65 centrally on its body 64, and pad mounting portions 67 at its open end closer to the drive source 21. The brake pads 35 are each fixed to a corresponding one of the pad mounting portions 67 via a rug 68. Bearing unit 71 is fitted in the bearing portion 65, and a collar 72 is snugly fitted between the bearing unit 71 and the connecting shaft 62. The braking resilient member 36 abuts at its one end against the collar 72 and at the other end against the connecting portion 61 of the clutch drum 31. The collar 72 is made, for example, of white metal and constructed to function as sliding bearings. Further, the braking resilient member 36 comprises, for example, a dish-shaped spring.

The rotating member 41 has a central mounting portion 73 projecting axially toward the drive source 21 and coupled to the crankshaft 22, and guide portions 74 projecting laterally from a base of the central mounting portion 73 in opposite directions for guiding respective ones of the moving members 45 of the clutch mechanism 23. Each of the clutch moving members 45, having the tapered outer side surface 44, has an inner protrusion 75 slidably fitted in the corresponding guide section 74. Each of the clutch moving members 45 also has an engaging portion 76 (FIG. 3) adjacent the inner protrusion 75 for engaging corresponding ends of the resilient members 46 (FIG. 3) of the clutch mechanism 23.

Figure 3:
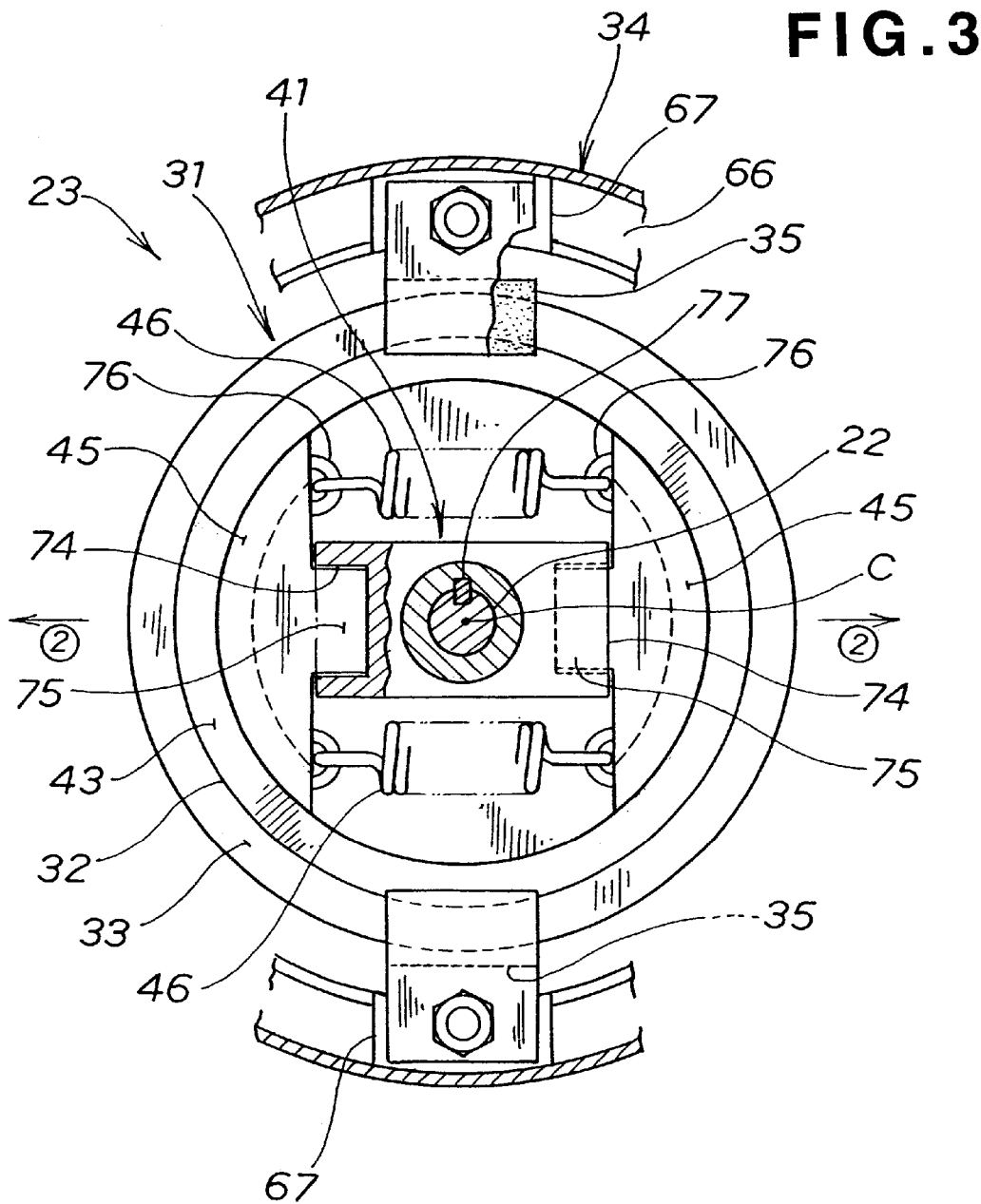
FIG. 3 is a sectional view of the bush cutting apparatus taken along the 3—3 line of FIG. 2.

FIG. 3 is a sectional view of the bush cutting apparatus taken along the 3—3 line of FIG. 2. As seen in FIG. 3, the two clutch moving members 45 are positioned symmetrically with (diametrically opposed to) each other about the centerline C of the rotating member 41 and radially slidable along the guide portions 74 as denoted by arrow ②. Also, it is seen in FIG. 3 that the diametrically-opposed clutch moving members 45 are engaged by the resilient members 46 and the clutch drum 31 has the tapered portion 43 to be acted on or pressed by the clutch moving members 45. As also clearly seen in FIG. 3, the brake shoe 33 of the brake mechanism 24 is formed integrally on the open end portion 32 of the clutch drum 31, and the brake pads 35 are secured to the housing 34 in opposed relation to the brake shoe 33. Reference numeral 77 in FIG. 3 represents a key interconnecting the rotating member 41 and the crankshaft 22.

Figure 4A:
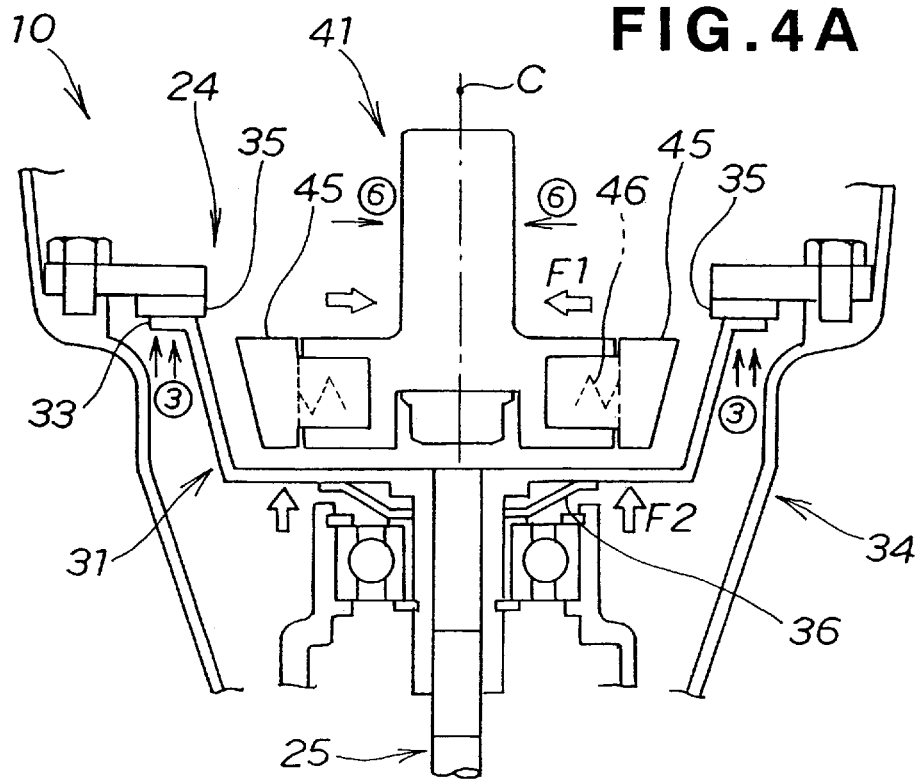
FIGS. 4A and 4B are views explanatory of behavior of the bush cutting apparatus shown in FIG. 2.
Figure 4B:
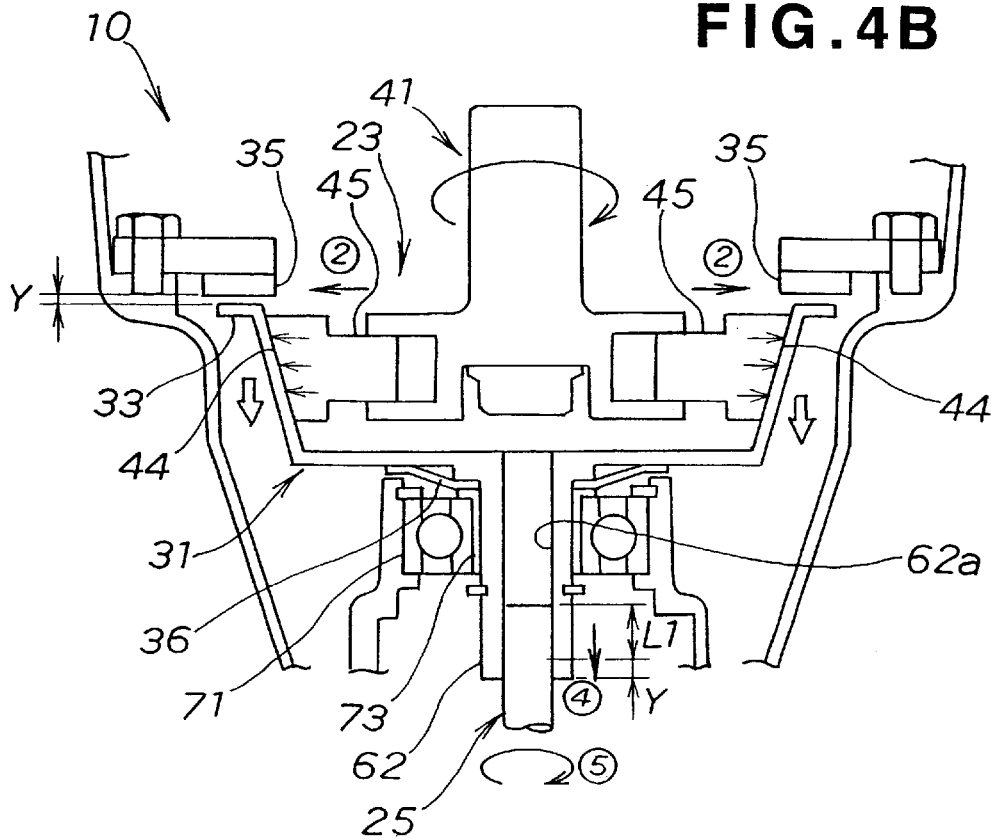

The following paragraphs describe behavior of the bush cutting apparatus 10 in accordance with the first embodiment of the invention constructed as above, with primary reference to FIGS. 4A and 4B.

In the brake mechanism 24 of the bush cutting apparatus 10, as shown in FIG. 4A, the brake shoe 33 is normally pressed against the brake pads 35 as denoted by arrow ③. To initiate bush cutting operations in this state, the drive source 21 is first activated, and then the rotating speed, i.e. the number of rotations, of the drive source 21 is caused to increase progressively.

Then, when the rotating speed of the drive source 21 has been increased to such an extent as to cause the rotating member 41 of the clutch mechanism 23 to rotate at more than a predetermined rotation speed, i.e. exceed a predetermined number of rotations, with the brake shoe 33 sliding along the surface of brake pads 35, the clutch moving members 45 slide radially outward, away from each other, by centrifugal force as denoted by arrow ② and thereby press the inner surface of the tapered portion 43 of the clutch drum 31 so that the tapered outer surfaces 44 of the moving members 45 cause the clutch drum 31 to axially slide to a non-braking position, as denoted by arrow ④, against the bias of the braking resilient member 36. Thus, the brake shoe 33 is moved away or disengaged from the brake pads 35 by a distance Y. As a result, the number of rotations can be further increased to allow the cutter-blade driving shaft 25 to rotate at a corresponding rate as denoted by arrow ⑤.

Conversely, when the rotating speed of the drive source 21 has been reduced to such an extent as to cause the rotating member 41 of the clutch mechanism 23 to rotate at less than a predetermined rotation speed, i.e. fall below a predetermined number of rotations, the moving members 45 are disengaged from the clutch drum 31 and resiliently moved radially inward away from the clutch drum 31, as denoted by arrow ⑥ in FIG. 4A, by pulling force F1 exerted by the resilient members 46. Thus, the clutch drum 31 resiliently moves back to the original position by force F2 exerted by the braking resilient member 36, where the brake shoe 33 is again pressed against the brake pads 35 to thereby apply the brakes such that the rotation of the clutch drum 31 and hence the rotation of the cutter-blade driving shaft 25 is terminated instantaneously.

Namely, with the rotating member 41 of the clutch mechanism 23 rotating at less than the predetermined rotation speed, the clutch moving members 45 are resiliently slid away from the clutch drum 31 by pulling force F1 of the resilient members 46, while the brake shoe 33 of the brake mechanism 24 is resiliently brought back into abutment against the brake pads 35 to automatically apply the brakes. Such arrangements can eliminate the need for the human operator to perform manual braking operation to stop the rotation of the cutter-blade driving shaft 25, and thereby can enhance the operability of the bush cutting apparatus 10.

Further, in the instant embodiment where the brake mechanism 24 is composed of the brake shoe 33 formed on the clutch drum 31, brake pads 35 provided on the housing 34 and braking resilient member 36 for normally pressing the brake shoe 33 against the brake pads 35, there is no need for the housing 34 to have a hole for passing component parts, such as a wire and rod, through the housing 34, so that enhanced dust-tightness and water-tightness can be achieved. Furthermore, because the brake mechanism 24 is arranged to automatically apply the brakes when the predetermined number of rotations is not reached, it is possible to dispense with component parts to be used for manual braking operation, such as a handling lever and wire, and thus the manufacturing costs of the bush cutting apparatus can be reduced considerably.

In addition, with the two moving members 45 of the clutch mechanism 23 provided symmetrically with each other about the centerline C of the rotating member 41, the weights of the component parts can be distributed uniformly to the center axis of the rotation, which can reliably prevent unwanted unbalance during the rotation. Further, the symmetrical arrangement permits synchronization between the two clutch moving members 45 and thereby allows the clutch mechanism 23 and brake mechanism 24 to operate smoothly, so that reliable brakes can be assured.

Furthermore, because the collar 72 is mounted on the connecting shaft 62 of the clutch drum 31 and also fitted in the bearing unit 71, the collar 72 can support the connecting shaft 62 with a reduced friction coefficient, so that the connecting shaft 62 and hence the brake shoe 33 can be readily slid to the non-braking position (in the arrow ④ direction of FIG. 4B). Furthermore, because the serrations 25a of the cutter-blade driving shaft 25 mesh with the serrations 62a of the connecting shaft 62 by the axial length L1, the connecting shaft 62 allows the brake shoe 33 to slide to the non-braking position (in the arrow ④ direction of FIG. 4B) while transmitting the rotational force.

Figure 5:
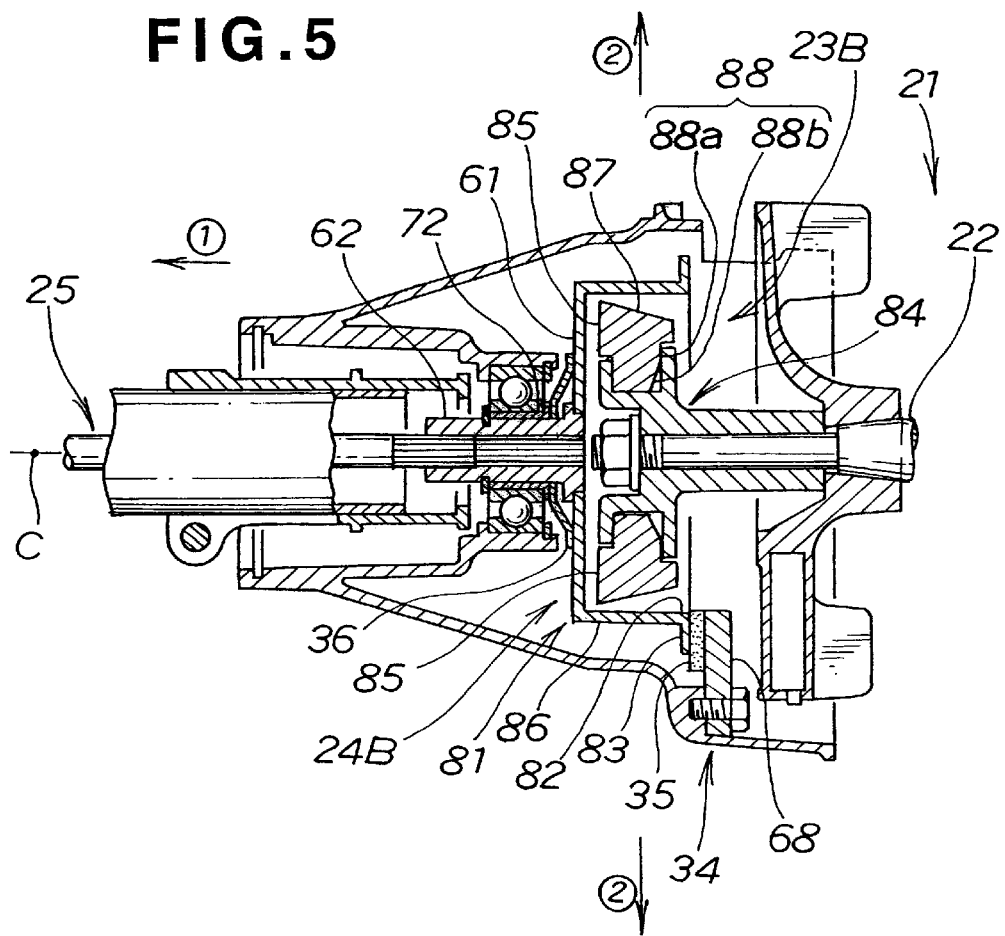
FIG. 5 is a sectional view of a bush cutting apparatus in accordance with a second embodiment of the present invention.

Next, a description will be made about a bush cutting apparatus in accordance with a second embodiment of the present invention. FIG. 5 is a sectional view of the bush cutting apparatus, in which the elements of the same structures and functions as those in FIG. 2 are represented by the same reference characters.

Clutch mechanism 23B includes a rotating member 84 mounted on a crankshaft 22 functioning as an output shaft of a drive source 21, and clutch moving members 85 mounted on the rotating member 84 for movement both along the radially outward directions of the rotating member 84 as denoted by arrow ② and along the axial direction of the crankshaft 22 as denoted by arrow ①. The clutch mechanism 23 further includes a clutch drum 81 that is mounted on a cutter-blade driving shaft 25 for movement along the axial direction (arrow ① direction) of the driving shaft 25, and clutch resilient members 46 (FIG. 6) that normally pulls the moving members 85 toward each other, i.e. toward the centerline C of the rotating member 84.

Brake mechanism 24B includes a brake shoe 83 formed, as a kind of radial flange, at the tip of its open end portion (right end portion in FIG. 5) 82 of the clutch drum 81, brake pads 35 secured to a non-rotating fixed housing 34 in axially-opposed relation to the brake shoe 83, and a braking resilient member 36 for normally pressing the brake shoe 83 against the brake pads 35. The clutch drum 81 has the brake shoe 83 of the brake mechanism 24B formed at the tip of its cylindrical portion 86, and a disk-shaped connecting portion 61 at its bottom end portion (left end portion in FIG. 5). Connecting shaft 62 is coupled to the connecting portion 61 of the clutch drum 81. Each of the clutch moving members 45 has a tapered outer side surface 87, and it has an inner protrusion 88 having an orthogonal portion 88a and a slanted portion 88b. Each of the clutch moving members 85 also has an engaging portion 76 (see FIG. 3) adjacent the inner protrusion 88 for engaging corresponding ends of the resilient members 46 of the clutch mechanism 23B.

Figure 6A:
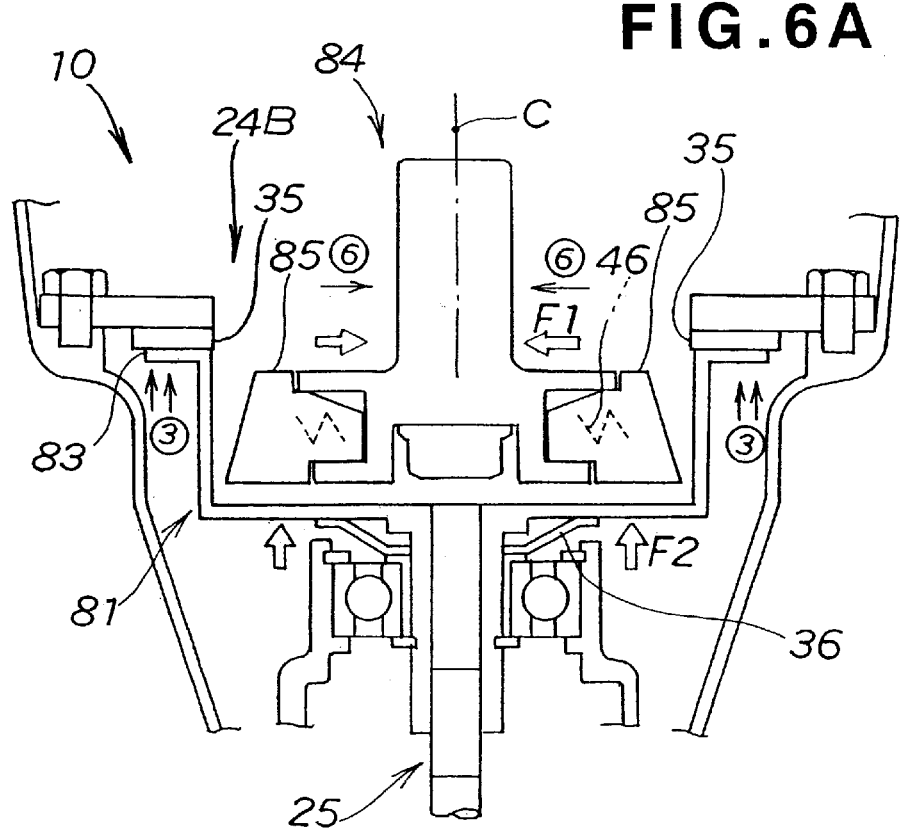
FIGS. 6A and 6B are views explanatory of behavior of the bush cutting apparatus shown in FIG. 5.
Figure 6B:
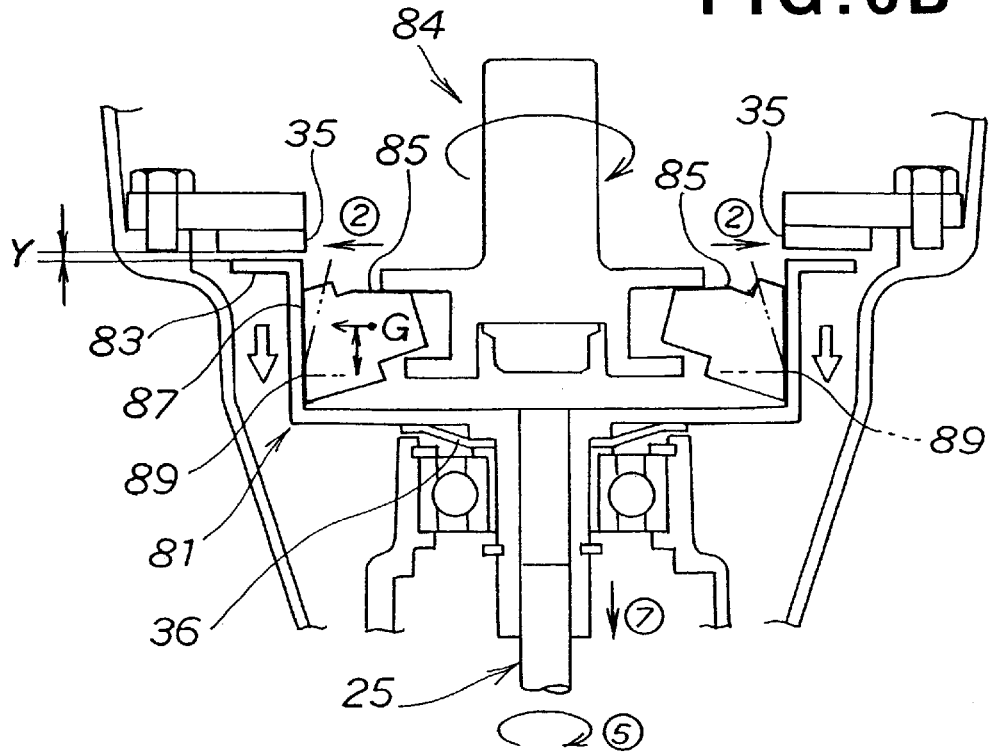

The following paragraphs describe behavior of the bush cutting apparatus 10 in accordance with the second embodiment of the invention constructed as above, with primary reference to FIGS. 6A and 6B.

In the brake mechanism 24B of the bush cutting apparatus 10, as shown in FIG. 6A, the brake shoe 83 is normally pressed against the brake pads 35 as denoted by arrow ③. To initiate bush cutting operations in this state, the drive source 21 is first activated, and the rotating speed of the drive source 21 is caused to increase progressively.

Then, when the rotation speed of the drive source 21 has been increased to such an extent as to cause the rotating member 84 of the clutch mechanism 23B to rotate at more than a predetermined rotation speed, i.e. exceed a predetermined number of rotations, the clutch moving members 85 slide radially outward away from the rotating member 84 by centrifugal force as denoted by arrow ②. Once respective bottom outer corners 89 of the clutch moving members 85 contact the inner surface of the clutch drum 81, the clutch moving members 85 move (almost tumble) in a direction away from the brake pads 35 (arrow ⑦) direction) because each of the clutch moving members 85 has its center of gravity G displaced or offset from the bottom outer corner due to the provision of the tapered outer side surface 87. Simultaneously, the clutch moving members 85 causes the clutch drum 81 to slide in the arrow ⑦ direction, against the bias of the braking resilient member 36, so that the brake shoe 83 is moved away from the brake pads 35 by a distance Y. As a consequence, the number of rotations can be further increased to allow the cutter-blade driving shaft 25 to rotate at a corresponding rate as denoted by arrow ⑤.

Conversely, when the rotating speed of the drive source 21 has been reduced to such an extent as to cause the rotating member 84 of the clutch mechanism 23B to rotate at less than a predetermined rotation speed, i.e. fall below a predetermined number of rotations, the moving members 85 are resiliently retracted away from the clutch drum 81, as denoted by arrow ⑥ in FIG. 6A, by pulling force F1 exerted by the clutch resilient members 46. Thus, the clutch drum 81 resiliently moves back to the original position by force F2 exerted by the braking resilient member 36, where the brake shoe 83 again abuts against the brake pads 35 to thereby apply the brakes, so that the rotation of the clutch drum 81 and hence of the cutter-blade driving shaft 25 is terminated instantaneously.

Because the rotating member 84 of the clutch mechanism 23B rotating at less than the predetermined rotation speed allows the brake mechanism 24B to automatically apply the brakes, it is possible to eliminate the need for manual braking operation to stop the rotation of the cutter-blade driving shaft 25 and thereby enhance the operability of the bush cutting apparatus 10. Also note that the brake mechanism 24B in the second embodiment can attain the same results as the brake mechanism 24 in the first embodiment.

It should also be appreciated that any suitable number of the clutch moving members may be employed in the present invention rather than being limited to just two. Further, the embodiments of the present invention have been described in relation to the case where the clutch moving members are caused to press the clutch drum by centrifugal force and slide the clutch drum axially to the non-braking position with their tapered outer side surfaces in an alternative, there may be provided a separate mechanism for axially sliding the clutch drum to the non-braking position. Furthermore, although the embodiments of the present invention have been described as employing two brake pads, three or more brake pads may be provided.

In summary, according to the present invention, when the rotating member is not rotated by the drive source at more than a predetermined rotation speed, the clutch moving member is kept disengaged from the clutch drum due to the pulling force of the clutch resilient members so that the brake shoe is normally pressed against the brake pad to apply the brakes. Such arrangements can eliminate the need for the human operator to manually manipulate a brake lever or the like, and thus allows the human operator to manipulate the bush cutting apparatus with a significantly enhanced operability. On the other hand, when the rotating member is rotated by the drive source at more than a predetermined rotation speed, the clutch moving member is moved, against the bias of the clutch resilient members, radially outward to press the clutch drum by centrifugal force in such a manner that the clutch drum is caused, by the tapered outer side surface of the clutch moving member, to axially slide to the non-braking position to allow the cutter blade to be rotated via the cutter-blade driving shaft.

Thus, the present invention can dispense with a lever and wire for braking operation by the human operator and eliminate the need for the apparatus housing to have a hole for passing component parts, such as a wire and rod, through the housing. As a result, the present invention can achieve enhanced dust-tightness and water-tightness of the bush cutting apparatus. Further, because the parts, such as the brake lever and wire, can be dispensed with, the bush cutting apparatus of the present invention can be manufactured at reduced costs.

In the case where a plurality of the clutch moving members are provided symmetrically with each other about the axial centerline of the rotating member, the weights of the moving members can be distributed uniformly to the center axis of the rotation and thus can reliably prevent unbalance during the rotation. Further, the symmetrical arrangement permits accurate synchronization between the two moving members and thereby allows the clutch mechanism and brake mechanism to operate smoothly, so that reliable brake performance can be accomplished.

The present disclosure relates to the subject matter of Japanese Patent Application No. 2001-014069, filed Jan. 23, 2001, the disclosure of which is expressly incorporated herein by reference in its entirety.

What is claimed is:

1. A bush cutting apparatus comprising:

a drive source having a body and an output shaft mounted in the body for undergoing rotation;

a cutter-blade driving shaft axially spaced from and operatively connected to the output shaft of the drive source for rotation therewith;

a cutter blade connected to the cutter-blade driving shaft for rotation therewith;

a housing connected to the body of the drive source;

a clutch mechanism disposed in the housing and having a rotational member mounted on the output shaft of the drive source for rotation therewith, at least one a clutch moving member having a tapered outer side surface and being mounted on the rotational member for sliding movement along a radial direction of the rotational member, a clutch drum mounted on the cutter-blade driving shaft for axial movement therealong for engagement with the clutch moving member and having a tapered portion with an inner surface corresponding in contour to the tapered outer side surface of the clutch moving member and a hollow connecting shaft connected to the cutter-blade driving shaft, a collar slidably mounted around the hollow connecting shaft, a bearing mounted around the collar and connected to the housing, and a clutch resilient member for biasing the clutch moving member toward an axial centerline of the rotational member; and a brake mechanism disposed in the housing and having a brake shoe formed at a tip of an open end portion of the clutch drum defining the greatest diameter region of the tapered portion of the clutch drum, a brake pad connected to the housing and disposed opposite to the brake shoe in an axial direction of the cutter-blade driving shaft, and a braking resilient member disposed between an end of the collar and the clutch drum for biasing the brake shoe into pressure contact with the brake pad;

wherein when the rotational member is not rotated by the drive source at a rotational speed higher than a preselected rotational speed, the clutch moving member is maintained disengaged from the clutch drum due to a biasing force of the clutch resilient member so that the brake shoe is pressed against the brake pad to apply a braking force, and when the rotating member is rotated by the drive source at a rotational speed higher than the preselected rotational speed, the clutch moving member is moved radially outward to press the clutch drum by a centrifugal force in such a manner that the clutch drum is caused, by the tapered outer side surface of the clutch moving member, to slide in a direction to disengage the brake shoe from the brake pad.

2. A bush cutting apparatus as claimed in claim 1; wherein the at least one clutch moving member comprises a plurality of clutch moving members mounted on the rotational member for sliding movement along a radial direction of the rotational member and disposed symmetrically with respect to the axial centerline of the rotational member.

3. A bush cutting apparatus comprising:

a drive source having a body and an output shaft mounted in the body for undergoing rotation;

a cutter-blade driving shaft connected to the output shaft of the drive source for rotation therewith;

a cutter blade connected to the cutter-blade driving shaft for rotation therewith;

a housing connected to the body of the drive source;

a clutch mechanism disposed in the housing and having a rotational member mounted on the output shaft of the drive source for rotation therewith, at least one clutch moving member mounted on the rotating member for movement along radial and axial directions of the rotational member; a clutch drum mounted on the cutter-blade driving shaft for axial movement thereal-ong; therealong for engagement with the clutch moving member and having a hollow connecting shaft connected to the cutter-blade driving shaft, a collar slidably mounted around the hollow connecting shaft, a bearing mounted around the collar and connected to the housing, and a clutch resilient member for biasing the clutch moving member toward an axial centerline of the rotational member; and a brake mechanism disposed in the housing and having a brake shoe formed at a tip of an open end portion of the clutch drum, a brake pad connected to the housing and disposed opposite to the brake shoe in an axial direction of the cutter-blade driving shaft, and a braking resilient member disposed between an end of the collar and the clutch drum for biasing the brake shoe into pressure contact with the brake pad;

wherein when the rotational member is not rotated by the drive source at a rotational speed higher than a preselected rotational speed, the clutch moving member is maintained disengaged from the clutch drum due to a biasing force of the clutch resilient member in such a manner that the brake shoe is pressed against the brake pad to apply a braking force, and when the rotating member is rotated by the drive source at a rotational speed higher than the preselected rotational speed, the clutch moving member is moved radially outward and axially to press and slide the clutch drum in a direction to disengage the brake shoe from the break pad.

4. A bush cutting apparatus as claimed in claim 3; wherein the at least one clutch moving member comprises a plurality of clutch moving members mounted on the rotational member for movement along radial and axial directions of the rotational member and disposed symmetrically with respect to the axial centerline of the rotational member.

5. A bush cutting apparatus comprising:

a drive source having a body and an output shaft mounted in the body for undergoing rotation;

a cutter-blade driving shaft axially spaced from and operatively connected to the output shaft of the drive source for rotation therewith;

a cutter blade connected to the cutter-blade driving shaft for rotation therewith;

a housing connected to the body of the drive source;

a clutch mechanism disposed in the housing and having a rotational member mounted on the output shaft of the drive source for rotation therewith, at least one clutch moving member mounted on the rotational member for movement along radial and axial directions of the rotational member and having a tapered outer side surface converging toward the output shaft of the drive source, a clutch drum mounted on the cutter-blade driving shaft for sliding movement therealong for engagement with the clutch moving member, and a clutch resilient member for biasing the clutch moving member toward an axial centerline of the rotational member; and a brake mechanism disposed in the housing and having a brake shoe formed at a tip of an open end portion of the clutch drum, a brake pad connected to the housing and disposed opposite to the brake shoe in an axial direction of the cutter-blade driving shaft, and a braking resilient member for biasing the brake shoe into pressure contact with the brake pad;

wherein when the rotational member is not rotated by the drive source at a rotational speed higher than a preselected rotational speed, the clutch moving member is maintained disengaged from the clutch drum due to a biasing force of the clutch resilient member so that the brake shoe is pressed against the brake pad to apply a braking force, and when the rotating member is rotated by the drive source at a rotational speed higher than the preselected rotational speed, the clutch moving member is moved radially outward and in the axial direction to press and slide the clutch drum in a direction to disengage the brake shoe from the brake pad.

6. A bush cutting apparatus as claimed in claim 5; wherein the at least one clutch moving member comprises a plurality of clutch moving members mounted on the rotational member for movement along radial and axial directions of the rotational member and disposed symmetrically with respect to the axial centerline of the rotational member.

7. A bush cutting apparatus according to claim 5; wherein the clutch drum has a hollow connecting shaft connected to the cutter-blade driving shaft; and wherein the clutch mechanism further comprises a collar slidably mounted around the hollow connecting shaft and a bearing mounted around the collar and connected to the housing, the braking resilient member being disposed between an end of the collar and the clutch drum to bias the clutch drum in a direction to press the brake shoe against the brake pad.

8. A bush cutting apparatus as claimed in claim 7; wherein the at least one clutch moving member comprises a plurality of clutch moving members mounted on the rotational member for movement along radial and axial directions of the rotational member and disposed symmetrically with respect to the axial centerline of the rotational member.

9. A bush cutting apparatus according to claim 5; wherein the clutch drum has a generally cylindrical-shaped inner surface.

10. A bush cutting apparatus according to claim 5; wherein the clutch drum has a generally cylindrical-shaped inner surface for contacting an outer end of the clutch moving member; and wherein the clutch moving member has a center of gravity disposed at a preselected location so that when an outer end of the clutch moving member contacts the cylindrical inner surface of the clutch drum, the clutch moving member is displaced in a direction away from the output shaft of the drive source to thereby bring the tapered outer side surface of the clutch moving member into engagement with the cylindrical inner surface of the clutch drum so that the clutch drum is slid in the direction to disengage the brake shoe from the brake pad.

11. A cutting apparatus comprising:

a first rotational shaft mounted for undergoing rotation;

a cutter blade connected to the first rotational shaft for rotation therewith;

a clutch mechanism having a rotational member, at least one clutch moving member mounted on the rotational member for undergoing movement along a radial direction of the rotational member, a clutch drum mounted on the first rotational shaft for sliding movement therealong to engage the clutch moving member, and a clutch resilient member for biasing the clutch moving member toward an axial centerline of the rotational member;

a brake mechanism having a brake shoe formed at an end portion of the clutch drum, a brake pad disposed opposite to and confronting the brake shoe, and a braking resilient member for biasing the brake shoe into pressure contact with the brake pad; and a drive source having a second rotational shaft for selectively rotating the rotational member of the clutch mechanism at rotational speeds higher or lower than a preselected rotational speed, the second rotational shaft being axially spaced from and operatively connected to the first rotational shaft via the clutch mechanism and the brake mechanism for rotationally driving the first rotational shaft.

12. A cutting apparatus according to claim 11; wherein when the rotational member is rotated by the second rotational shaft at a rotational speed lower than the preselected rotational speed, the clutch moving member is disengaged from the clutch drum by a biasing force of the clutch resilient member and the clutch drum is slid to a preselected braking position where the brake shoe is pressed against the brake pad to apply a breaking force; and wherein when the rotational member is rotated by the second rotational shaft at a rotational speed higher than the preselected rotational speed, the clutch moving member moves in a direction to slide the clutch drum to a preselected non-braking position against the bias of the braking resilient member so that the brake shoe is disengaged from the brake pad to release the braking force.

13. A cutting apparatus according to claim 11; further comprising a housing connected to a body of the drive source; and wherein the clutch mechanism and the brake mechanism are disposed in the housing.

14. A cutting apparatus according to claim 11; wherein the at least one clutch moving member comprises a plurality of clutch moving members mounted on the rotational member for undergoing movement along a radial direction of the rotational member and disposed symmetrically with respect to the axial centerline of the rotational member.

15. A bush cutting apparatus according to claim 11; wherein the clutch moving member has a tapered outer side surface; and wherein the clutch drum has a tapered portion having an inner surface corresponding in contour to the tapered outer side surface of the clutch moving member.

16. A bush cutting apparatus according to claim 11; wherein the clutch moving member has a tapered outer side surface converging toward the second rotational shaft.

17. A bush cutting apparatus according to claim 11; wherein the clutch drum has a generally cylindrical-shaped inner surface.

18. A bush cutting apparatus according to claim 11; wherein the clutch drum has a generally cylindrical-shaped inner surface for engagement with a tapered outer side surface of the clutch moving member; and wherein the clutch moving member has a center of gravity disposed at a preselected location so that when an outer end of the clutch moving member contacts the cylindrical inner surface of the clutch drum, the clutch moving member is displaced in a direction away from the second rotational shaft to thereby bring the tapered outer side surface of the clutch moving member into engagement with the cylindrical inner surface of the clutch drum so that the clutch drum is slid in the direction to disengage the brake shoe from the brake pad.

19. A bush cutting apparatus according to claim 11; wherein the at least one clutch moving member comprises a plurality of clutch moving members mounted on the rotational member for undergoing movement along a radial direction of the rotational member and disposed symmetrically with respect to the axial centerline of the rotational member.

* * * * *